United States Patent [19]

Yoshitsugu

[11] Patent Number: 4,730,875
[45] Date of Patent: Mar. 15, 1988

[54] WEBBING GUIDE FOR USE WITH SEAT BELT APPARATUS

[75] Inventor: Noritada Yoshitsugu, Aichi, Japan

[73] Assignee: Toyota Jidosha Kabushiki Kaisha, Toyota, Japan

[21] Appl. No.: 75,068

[22] Filed: Jul. 17, 1987

[30] Foreign Application Priority Data

Jul. 22, 1986 [JP] Japan ............... 61-112565[U]

[51] Int. Cl.⁴ ............................................. A62B 35/00
[52] U.S. Cl. .................................. 297/468; 297/481; 297/483
[58] Field of Search ............... 297/468, 483, 475, 481

[56] References Cited

U.S. PATENT DOCUMENTS

| | | | |
|---|---|---|---|
| 3,963,273 | 6/1976 | Nagazumi | 297/481 |
| 4,323,278 | 4/1982 | Sukopp et al. | 297/481 |
| 4,348,037 | 9/1982 | Law et al. | 297/483 |
| 4,482,187 | 11/1984 | Nagashima et al. | 297/468 |
| 4,557,523 | 12/1985 | Motonami et al. | 297/468 |

FOREIGN PATENT DOCUMENTS

| | | |
|---|---|---|
| 51-64319 | 5/1976 | Japan. |
| 52-11722 | 1/1977 | Japan. |
| 52-164829 | 12/1977 | Japan. |
| 55-34860 | 3/1980 | Japan. |
| 58-82969 | 6/1983 | Japan. |
| 60-45247 | 3/1985 | Japan. |
| 60-191301 | 12/1985 | Japan. |
| 62-97862 | 6/1987 | Japan. |

Primary Examiner—Francis K. Zugel
Attorney, Agent, or Firm—Cushman, Darby & Cushman

[57] ABSTRACT

A webbing guide for use with a seat belt apparatus having a length of webbing which has shoulder and lap webbing portions and an end portion adapted to be wound onto a reel device. The webbing guide is disposed on and at the side of a seat back of a seat for a passenger to sit on and has a guide hole for inserting therethrough the shoulder webbing portion. The guide hole is in the form of a continuous slot and has a crank-shaped outline. The shoulder webbing portion is thus kept from becoming twisted or reversed in the guide hole.

19 Claims, 15 Drawing Figures

WEBBING GUIDE FOR USE WITH SEAT BELT APPARATUS

BACKGROUND OF THE INVENTION

The present invention relates to a webbing guide for use with a seat belt apparatus provided for the protection of passengers in a vehicle in case of emergency, and more particularly to a webbing guide of this kind which is capable of guiding a shoulder webbing of the apparatus in the fore-and-aft direction of the vehicle so as to allow a passenger to put on the seat belt webbing properly and easily.

In a seat belt apparatus having a single length of webbing formed of two continuous shoulder and lap webbing portions, one end of the webbing is wound on a webbing reel device provided on a side wall of the vehicle, the other end of the webbing is secured to the vehicle's side wall by an anchor plate, and an intermediate portion of the webbing is hung through a slip joint so as to be guided thereby.

With such a seat belt apparatus, when a tongue plate slidably carried by the intermediate portion of the webbing that is between the slip joint and the anchor plate is engaged by a passenger with a buckle device supported at a substantially central location in the widthwise direction of the vehicle, the passenger can put on the webbing of the seat belt. When the passenger disengages the tongue plate from the buckle device and releases the webbing from the fastened condition, the webbing moves so as to be wound onto the reel device by the reeling force of the device, and the tongue plate moves toward the rear of the vehicle together with the webbing. Accordingly, when a passenger attempts to put on the seat belt after sitting on a seat, he has to grasp the tongue plate by greatly twisting his upper torso toward the rear of the vehicle.

Figure 15:
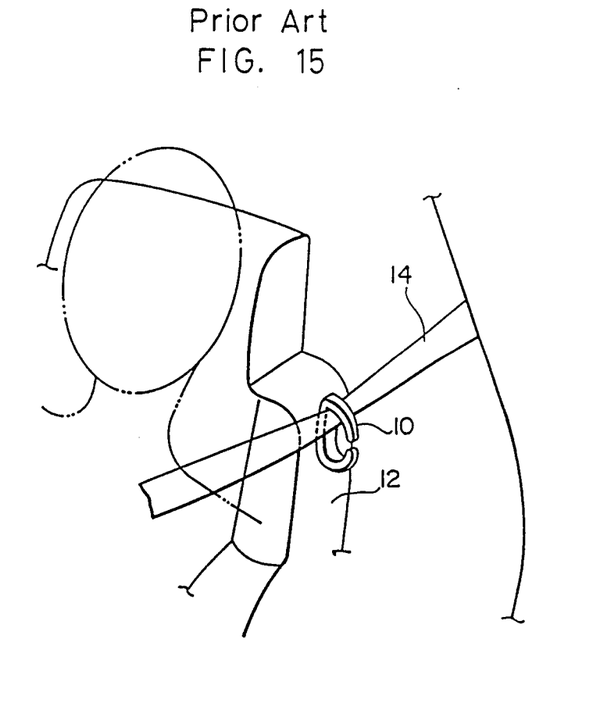
FIG. 15 is a perspective view of another conventional webbing guide.

In order to avoid this inconvenience, a proposal has been made concerning an annular guide 10 for the webbing, as shown in FIG. 15, which is provided on a side of a seat back 12.

With this conventional webbing guide, however, when the passenger, indicated by a two-dot chain line in FIG. 15, has a large body, the webbing guide 10 tends to depress the upward movement of the webbing 14, thus causing displacement of the webbing when it passes through the annular guide and, hence, an increase in the sliding resistance, thereby making it impossible for winding up and reeling off of the webbing to occur smoothly. Therefore, the webbing cannot be put on comfortably.

This displacement of the webbing can be avoided if the webbing guide 10 is extended upwardly. With this arrangement, however, the webbing guide 10 will project upwardly from the seat back 12 to an undue extent, thus spoiling the appearance of the seat and reducing its commercial value.

Conversely, with the webbing guide having an annular portion disposed on the upper surface of a seat back, as disclosed in Japanese Utility Model Laid-Open No. 45247/1985, the webbing cannot be put on comfortably by a passenger with a small body.

Figure 11:
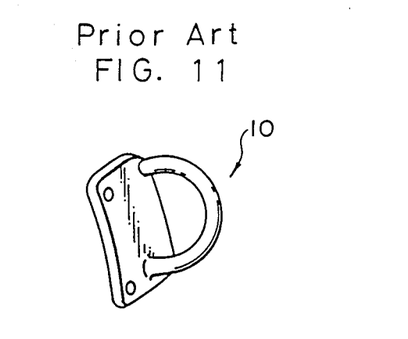
FIG. 11 is a perspective view of a conventional webbing guide.
Figure 12:
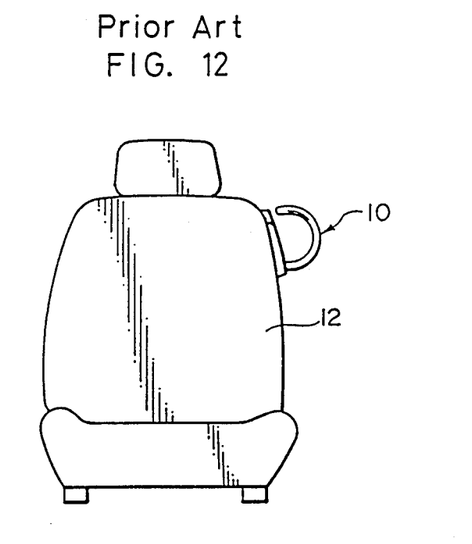
FIG. 12 is a front view of the conventional webbing guide shown in FIG. 11 mounted on a seat.
Figure 13:
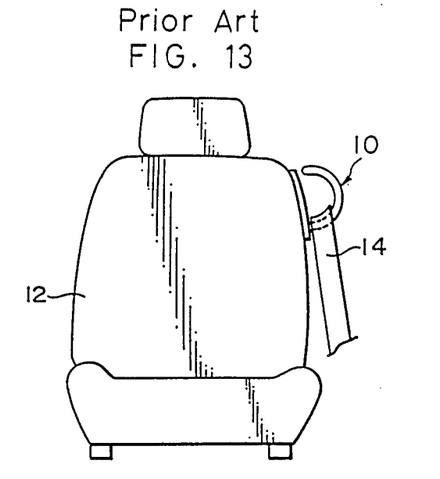
FIGS. 13 and 14 are front views corresponding to FIG. 12 and are used in explaining the operation of the conventional webbing guide.
Figure 14:
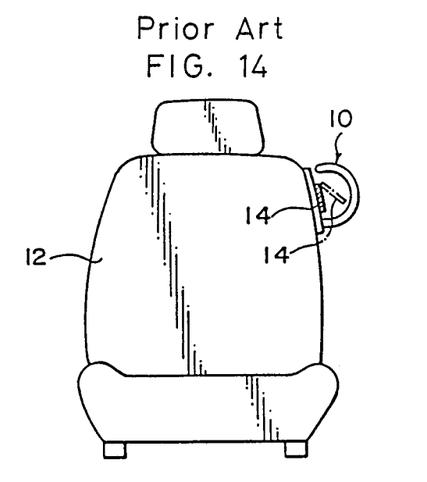

Another proposal has been made concerning a webbing guide 10, as shown in FIG. 11, which is mounted on a side of a seat back 12, as shown in FIG. 12. With this webbing guide, as shown in FIG. 13, the webbing 14 can be hung through the guide with its width kept in a substantially horizontal position when it is not in use. Also, as shown in FIG. 14, this webbing guide is capable of guiding the webbing 14 with its width inclined in a substantially vertical direction when it is to be put on, and is also capable of allowing the webbing 14 to be put on in a state of disengagement from the guide 10.

These features of the above-described conventional webbing guides, therefore, provide the following advantages. The webbing 14 is less subject to sliding resistance from the webbing guide 10 when the seat back 12 is brought to a reclining position while the webbing is not in use, or when the webbing is being reeled off. In addition, the webbing can be put on comfortably by passengers having bodies of various sizes.

Although the above-described arrangements of the webbing guide allows less restricted movement of the webbing, the arrangement is not free from the following risks. That is, the webbing 14 may become twisted or reversed, as indicated by the chain line in FIG. 14. In addition, the webbing 14 may be brushed against the webbing guide 10 when being wound up after it has been unfastened, thus making the winding operation difficult.

In order to avoid these disadvantages, another webbing guide has been proposed by Japanese Utility Model Laid-Open No. 82969/1983 entitled "Neck Contact Prevention Device". The device has sliding members provided at the corner formed by the upper surface of a seat back and a side surface of a head rest and having a holding portion for disengageably holding the seat belt and an adjusting mechanism for arbitrarily selecting the path of back and forth movement of the seat belt by moving the holding portion along the corner-forming surfaces.

With this device, however, since the sliding members are movable members, the arrangement is complicated. In addition, the adjusting operation performed by employing the adjusting mechanism is also complicated.

SUMMARY OF THE INVENTION

In view of the above-described circumstances, an object of the present invention is to provide a webbing guide for use with a seat belt apparatus, which has a simple structure that does not neccesitate movable elements, which is capable of supporting a length of webbing in a state of being hung substantially horizontally when the webbing is not in use and is capable of ensuring that the webbing can be put on comfortably by passengers having bodies of various sizes when the webbing is used, and which does not spoil the overall appearance of the seat.

According to the present invention, a webbing guide for use with a seat belt apparatus has a guide hole in the form of a continuous slot through which a shoulder webbing is inserted and which opens in the fore-and-aft direction of a vehicle. With this arrangement, the shoulder webbing is kept from becoming twisted or reversed in the guide hole.

The guide hole of the webbing guide of the present invention comprises an intermediate slot portion extending substantially vertically, an upper slot portion extending continuously from the upper part of the intermediate slot portion toward the widthwise center of the associated seat, and a lower slot portion extending continuously from the lower part of the intermediate slot portion and substantially horizontally away from the widthwise center of the seat. With this arrangement, the shoulder webbing is movable from one of the abovestated slot portions to another, and, when being led through the upper or lower slot portions, the webbing is able to assume a width position which is different from that which it assumes when being led through the intermediate slot portion.

With the webbing guide of the present invention which has the above-mentioned structure, when the webbing is put on by a passenger, the shoulder webbing moves within the guide slot due to the reeling force of a reel device in accordance with the size of the body of the passenger so that, when the latter size is small, the shoulder webbing passes through the intermediate slot portion, while, when it is large, the shoulder webbing passes through the upper slot portion.

On the other hand, when the webbing is released from the state of being fastened around a passenger, the webbing is hung through the lower slot portion of the webbing guide by the reeling force of the reel device.

DESCRIPTION OF THE PREFERRED EMBODIMENTS

Figure 1:
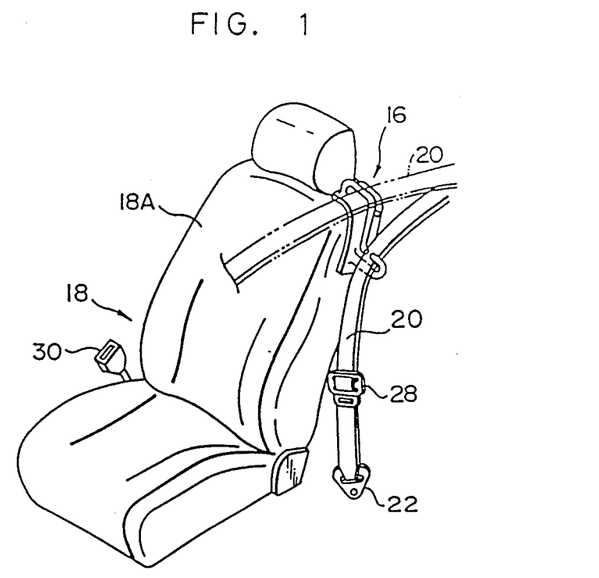
FIG. 1 is a perspective view of a seat belt apparatus to which a webbing guide in accordance with a first embodiment of the present invention is applied.
Figure 2:
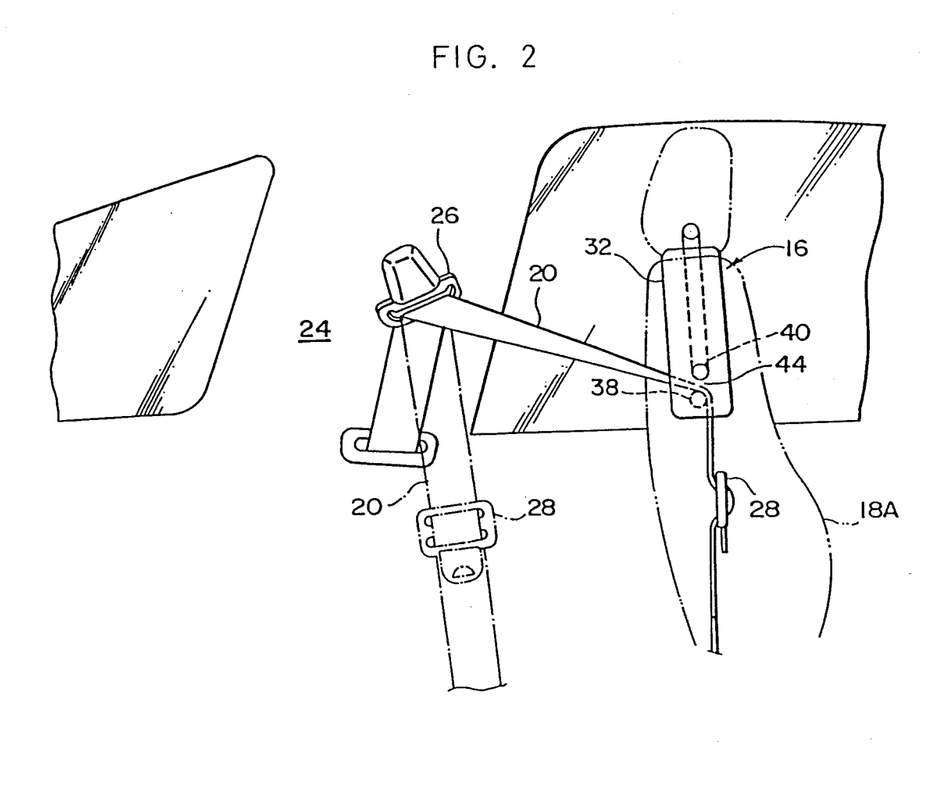
FIG. 2 is a side view of the seat belt apparatus shown in FIG. 1 taken from the opposite side of the seat to which the guide is attached.

FIGS. 1 and 2 show a seat belt apparatus used by, for instance, a person sitting on a left front seat, to which a webbing guide 16 in accordance with a first embodiment of the present invention is applied.

A length of webbing 20, which is to be put on by a person sitting on the seat 18, has one end supported by a vehicle side wall 24 through an anchor plate 22 and the other end supported by the vehicle side wall 24 through a reel device (not shown). In addition, an intermediate portion of the webbing 20 is hung through a slip joint 26 supported by the vehicle side wall 24. The reel device operates to wind up the webbing 20 with an urging force, and includes an inertia-lock mechanism which prevents the reeling off of the webbing 20 in an emergency.

A tongue plate 28 is carried by the intermediate portion of the webbing that is between the anchor plate 22 and the slip joint 26 in such a manner as to be movable in the longitudinal direction of the webbing 20. This tongue plate 28 is engageable with a buckle device 30 supported at a substantially central location in the widthwise direction of the vehicle.

Figure 3:
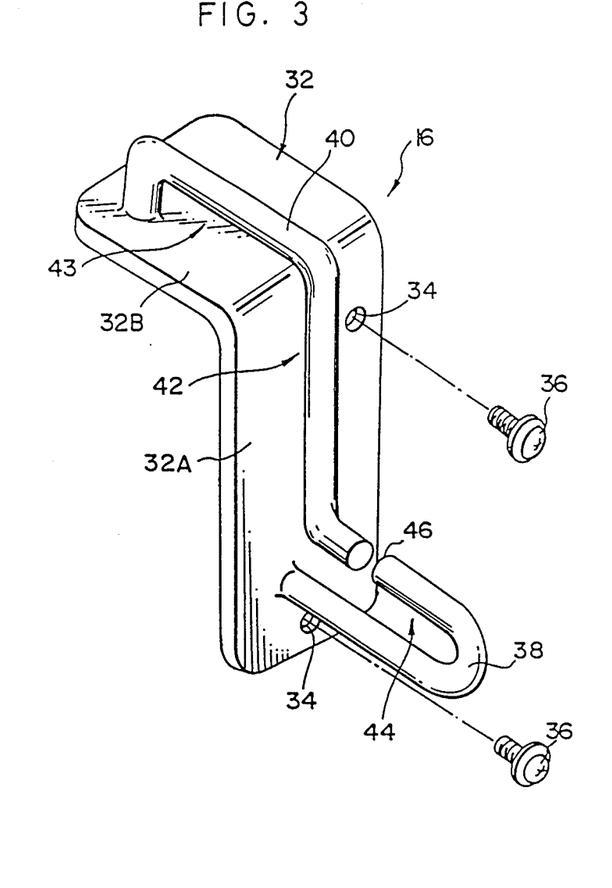
FIG. 3 is a perspective view of the webbing guide shown in FIG. 1.
Figure 4:
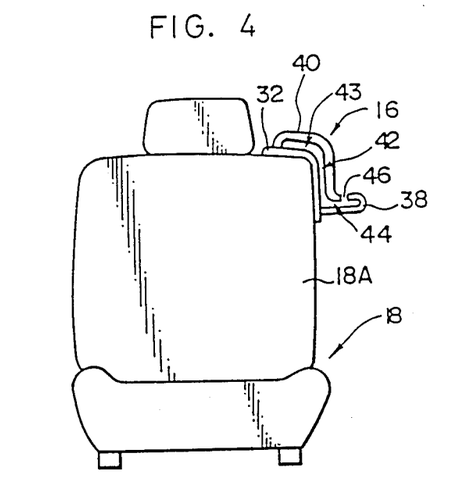
FIG. 4 is a front view of the webbing guide shown in FIG. 1.

As shown in FIGS. 3 and 4, the webbing guide 16 has, as a base member, a base plate 32 which is made of synthetic resin and has a section generally shaped like an inverted letter L. The base plate 32 comprises a vertical wall portion 32A extending substantially vertically and disposed on an upper part of the left side of a seat back 18A of the seat 18, and a horizontal wall portion 32B extending substantially horizontally and disposed on a left portion of the top of the seat back 18A. The base plate 32 is fixed to the seat back 18A by screws 36 inserted through mounting holes 34 formed in the vertical wall portion 32A.

A lower arm 38 which has a generally circular cross section and is generally shaped like a letter J projects from the vertical wall portion 32A. More specifically, this lower arm 38 extends substantially horizontally from the vertical wall portion 32A away from the seat back 18A until it is smoothly bent back upward substantially at 180 degrees so that the remainder portion extends substantially horizontally toward the seat back 18A in parallel with and in spaced relation to the lower horizontal portion.

An upper arm 40 having a generally circular cross section projects from the horizontal wall portion 32B. The lower and upper arms 38 and 40 may have a cross-sectional configuration other than circular. The upper arm 40 extends along the horizontal and vertical wall portions in spaced relation thereto. That is, the upper arm 40 first extends upward from the horizontal wall portion 32B, is then bent smoothly substantially at 90 degrees so as to extend away from the seat back 18A in parallel with the horizontal wall portion 32B, is again bent smoothly downward substantially at 90 degrees so as to extend vertically in parallel with the vertical wall portion 32A, and is further bent smoothly substantially at 90 degrees so as to extend horizontally away from the seat back 18A. The free end of the upper arm 40 opposes the free end of the lower arm 38 with a clearance 46 therebetween. The lower and upper arms 38 and 40, which constitute arm members, are formed of synthetic resin integrally with the base plate 32.

The webbing guide 16 has a webbing guide hole or slot which is formed by the base plate 32 and the lower and upper arms 38 and 40 and is continuous in a generally Z-like shape. The guide slot comprises a slit-like intermediate slot portion 42 extending substantially vertically, a slit-like upper slot portion 43 extending continuously from the upper part of the intermediate slot portion 42 and substantially horizontally toward the widthwise center of the vehicle, and a slit-like lower slot portion 44 extending continuously from the lower part of the intermediate slot portion 42 and substantially horizontally away from the widthwise center of the vehicle.

An intermediate portion of the webbing 20 is inserted into the lower slot portion 44 through a clearance 46 between the opposing ends of the lower and upper arms 38 and 40. The webbing 20 which has been inserted in this way is freely movable widthwise thereof between the lower slot portion 44, the intermediate slot portion 42, and the upper slot portion 43, and is slidable smoothly lengthwise thereof whichever of the slot portions of the webbing guide it is passed through.

The operation of the webbing in accordance with this embodiment will now be described with additional reference to FIGS. 5 to 7.

When the webbing 20 is not fastened around a passenger and when the webbing guide 16 is simultaneously not in use, the position of the intermediate portion of the webbing 20 that is between the slip joint 26 and the anchor plate 22 is the one indicated by chain lines shown in FIG. 2. When the webbing is not in use but when the webbing guide 16 is simultaneously being used, the position of the intermediate portion of the webbing 20 is the one indicated by solid lines in FIG. 2. That is, as also shown in FIG. 1 (in solid lines) and FIG. 5, in the latter case the intermediate portion of the webbing 20 is passed through the lower slot portion 44 and is hung on the lower arm 38. With this condition of the webbing 20, since the intermediate portion of the webbing is inserted through the lower slot portion 44 with its width being kept substantially horizontal, even when the seat back 18A is being brought to a reclining position and the position of the lower slot portion 44 is changed along an arcuate locus, the webbing will not hinder the operation because it will not be forced to be twisted or bent and will follow the arcuate movement of the lower slot portion. For the same reason as above, the operation of reeling off the webbing 20 in this condition can be performed smoothly before a passenger puts on the webbing.

Figure 5:
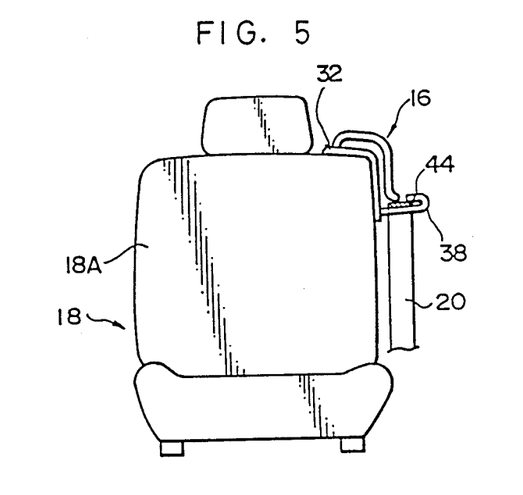
FIGS. 5 to 7 are front views corresponding to FIG. 4 and are used in explaining the operation of the webbing guide.

With the condition of the webbing 20 shown in FIG. 5 and also indicated by solid lines in FIGS. 1 and 2, since the tongue plate 20 is located at a position in the vicinity of the side of the seat back 18A, a passenger seated on the seat 18 can grasp the tongue plate 20 easily without any need to twist his upper torso to a significant extend toward the rear, and can reel off the webbing 20 smoothly as mentioned above. Once the tongue plate 28 is engaged with the buckle device 30, the portion of the webbing 20 that is between the slip joint 26 and the tongue plate 28 acts as a shoulder webbing while the portion of the webbing 20 that is between the tongue plate 28 and the anchor plate 22 acts as a lap webbing, and the webbing is thus fastened around a passenger.

When the webbing 20 is being put on in this way, it is moved to and passed through either the intermediate slot portion 42 or the upper slot portion 43. Either position of the webbing to which it is moved from the above-described initial position is the optimum position of the webbing for it to be guided smoothly in the fore-and-aft direction of the vehicle with respect to a particular passenger in the seat 18.

These operations will be described specifically. Since the reeling force of the reel device acts on the webbing 20, the webbing 20 reeled off from the device tends to run a minimum distance unless restricted by some other factors. In the webbing guide 16, while movement of the webbing 20 thicknesswise thereof is limited by the guide slot-forming walls with which the webbing is in contact, the webbing 20 is movable widthwise thereof within the guide slot. Consequently, in the passenger's operation of putting-on the webbing 20, the webbing 20 moves within the guide slot widthwise of the webbing with the thicknesswise movement thereof being restricted within a certain range to a position at which the webbing 20 runs a minimum distance through the webbing guide 16. The position of the webbing assumed in this way is a position assuring that the webbing 20 follows the belt path which is most natural and is free from forces within the restricted range of movement of the webbing in the thicknesswise direction.

Figure 6:
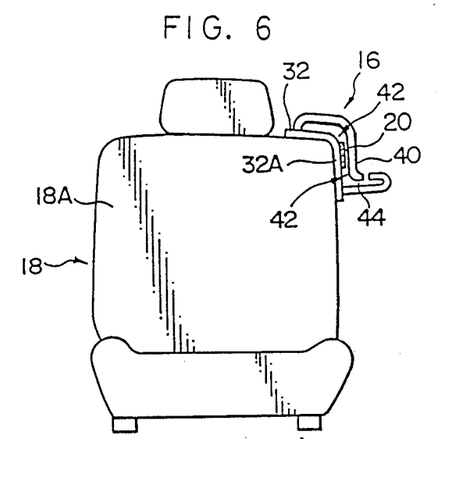
Figure 7:
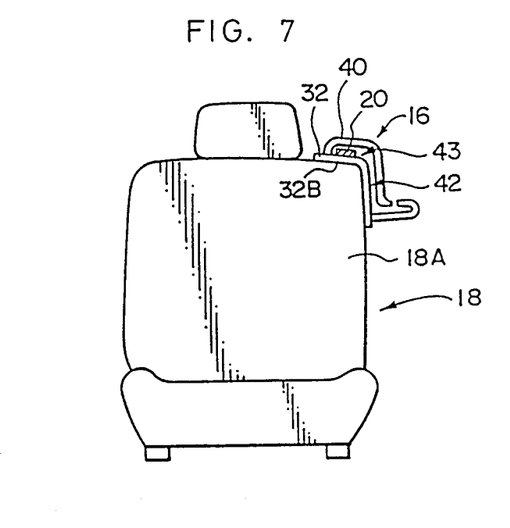

When the passenger has a small body, such as in the case of a woman or a child, the webbing 20 moves from the lower slot portion 44 to the intermediate slot portion 42, as shown in FIG. 6. With this position of the webbing, the width of the webbing is not displaced.

On the other hand, when the passenger has a large body, since the webbing 20 is reeled off by being pulled in a more upward direction than in the former case, the webbing 20 moves through to the upper slot portion 43. Also in this case, the width of the webbing is not displaced.

When a passenger disengages the tongue plate 28 from the buckle device 30 and releases the webbing 20, it starts to be wound onto the reel device by the reeling force, and is moved from the intermediate slot portion 42 or upper slot portion 43 to the lower slot portion 44 in a manner similar to the above-described movement by the pulling force of the reeling device, and is hung on the lower arm 38. Thus, the webbing 20 returns to the position assumed before the operation of putting on the webbing. This means that the webbing 20 is ready to be reeled off smoothly when it is again put on by a passenger.

As described above, according to this embodiment of the present invention, since the guide hole of the webbing guide consists of continuous slot portions and is generally Z-shaped, the webbing can be moved to an appropriate position both when the webbing is put on and when it is taken off without requiring any adjusting operation.

Figure 8:
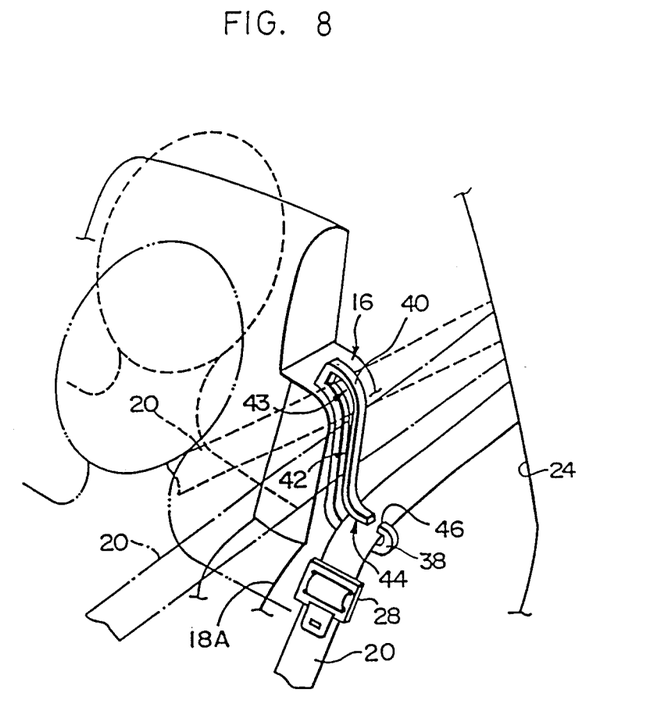
FIG. 8 is a perspective view of a webbing guide in accordance with a second embodiment of the present invention.
Figure 9:
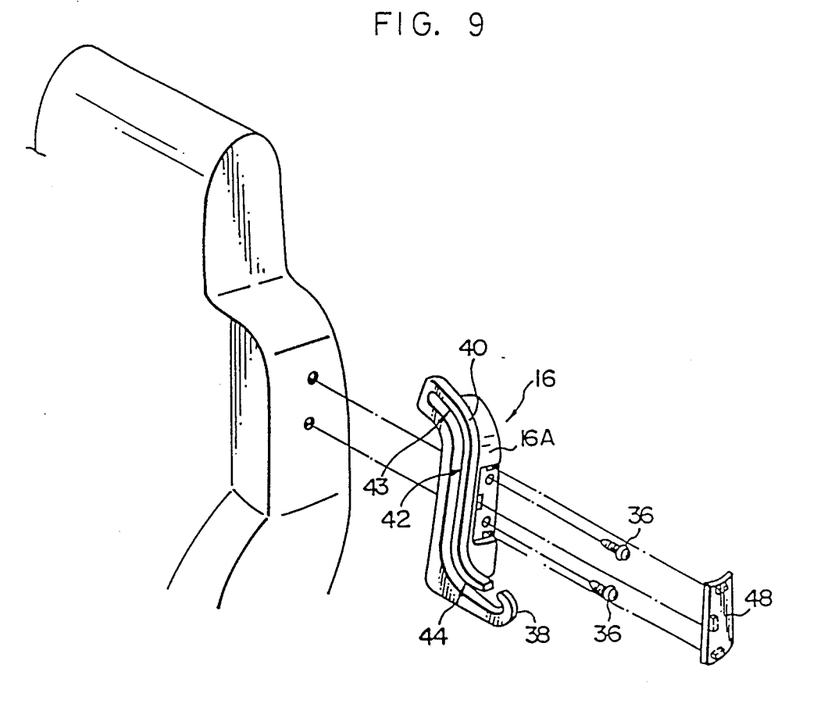
FIG. 9 is an exploded perspective view of the webbing guide shown in FIG. 8.

FIGS. 8 and 9 show a second embodiment of the present invention. While the arrangement and operation of the intermediate slot portion 42 and the lower slot portion 44 of the webbing guide 16 in accordance with this embodiment is basically the same as that of the webbing guide 16 of the first embodiment, the arrangement of the upper slot portion 43 is different. That is, the upper slot portion 43 of the webbing guide of this embodiment extends obliquely upward and is curved in the widthwise inner direction of the seat back 18A. Neverthless, the operation of this upper slot portion 43 is essentially the same as that of the corresponding element of the first embodiment.

In the second embodiment, the lower and upper arms 38 and 40 have a rectangular cross section. In addition, the webbing guide is provided with a cap 48 for covering the attaching screws 36 in such a manner that the outer surface of the cap 48 is aligned with that of a main body 16A serving as a base member, thus further improving the overall appearance of the interior of the vehicle. Needless to say, the lower and upper arms 38 and 40 may have a cross-sectional configuration other than rectangular.

Figure 10:
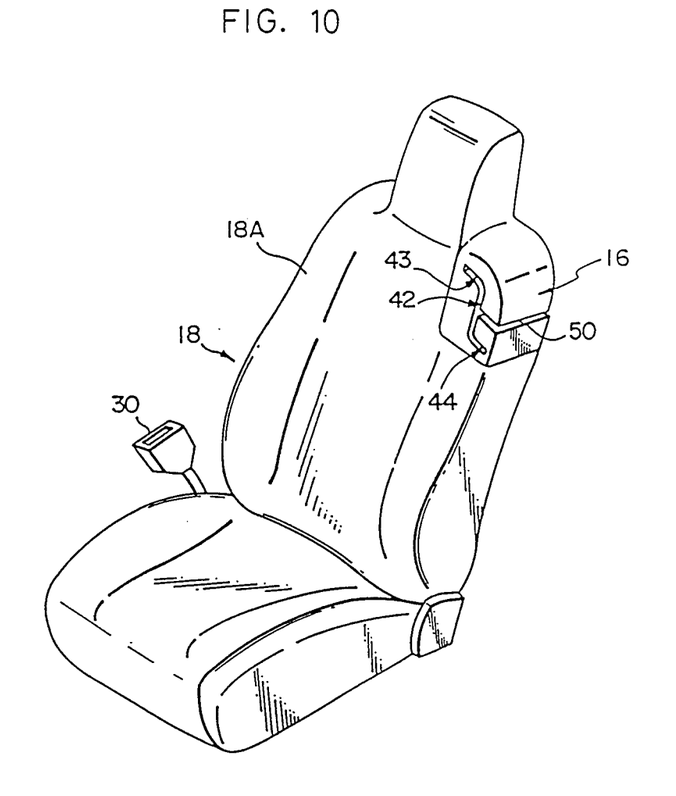
FIG. 10 is a perspective view of a webbing guide in accordance with a third embodiment of the present invention.

FIG. 10 show a third embodiment of the present invention. In contrast with the foregoing two embodiments, the webbing guide 16 of this embodiment is in the form of a block which is integrally incorporated into the seat back 18A, and the slot portions 42, 43, and 44 of the guide slot are provided as slit-like holes penetrating the thickness of the block. In addition, a slit 50, through which the webbing is inserted into the guide slot, and therefore corresponds to the clearance 46 of the first and second embodiments, extends into the intermediate slot portion 42.

In the third embodiment, since the webbing guide 16 is integral with the seat back 18A and is not projecting outwardly therefrom, the interior of the vehicle has wider free space and a much better appearance.

The block which forms the webbing guide 16 may be modified so as to be removable from the seat back 18A. With this modification, the webbing guide can be detached from the seat back together with the webbing during maintenance or when a passenger is attempting to be seated on a back seat of the vehicle. This feature also makes it possible to omit the slit 50.

As described above, according to the present invention, a webbing guide for use with a seat belt apparatus, has a simple structure which does not neccesitate movable elements, is capable of supporting a length of webbing in a state of being hung substantially horizontally when the webbing is not in use and is capable of ensuring that the webbing can be comfortably put on by passengers having bodies of various sizes when the webbing is used, and does not spoil the overall appearance of the seat.

What is claimed is:

1. A webbing guide for use with a seat belt apparatus having a length of webbing which consists of continuous shoulder and lap webbing portions and has an end portion adapted to be wound onto a reel device, said webbing guide being disposed on and at the side of a seat back of a seat on which a passenger in a vehicle may sit and having a guide hole opening in the fore-and-aft direction of said vehicle for passage therethrough of said shoulder webbing portion; wherein said guide hole is in the form of a slot and comprises a first slot portion extending substantially vertically, a second slot portion which is continuous with the upper part of said first slot portion and extends in the widthwise inner direction of said seat back, and a third slot portion which is continuous with the lower part of said first slot portion and extends substantially horizontally in the widthwise outer direction of said seat back.

2. A webbing guide according to claim 1, wherein said guide hole is formed by a base member mounted on said seat back and arm members projecting from said base member.

3. A webbing guide according to claim 2, wherein said base member has a first wall portion disposed on a side of said seat back and a second wall portion extending continuously from said first wall portion and disposed on the top of said seat back.

4. A webbing guide according to claim 3, wherein said arm members consist of a first arm projecting from said second wall portion and extending along said second and first wall portions, and a second arm projecting from said first wall portion and extending generally in the shape of a letter J.

5. A webbing guide according to claim 4, wherein the free end of said first arm and the free end of said second arm are disposed in opposition with a clearance therebetween for insertion therethrough of said webbing laterally into said guide hole.

6. A webbing guide according to claim 5, wherein said base plate has mounting holes formed therein for allowing said webbing guide to be fastened to said seat back.

7. A webbing guide according to claim 2, wherein said base member and said arm members are integrally formed of synthetic resin.

8. A webbing guide according to claim 1, wherein said second slot portion is curved in the widthwise inner direction of said seat back and extends obliquely upward from said first slot portion.

9. A webbing guide according to claim 1, wherein said webbing guide is formed of a block member and is mounted on said seat back so as to form a substantially integral portion thereof.

10. A webbing guide disposed on and at the side of a seat back of a seat on which a passenger in a vehicle may sit for use with a seat belt apparatus having a length of webbing which includes a first portion used as a shoulder webbing and a second portion used as a lap webbing and which has an end portion secured to the vehicle structure and the other end portion adapted to be wound onto a reel device, said webbing guide having a guide hole opening in the fore-and-aft direction of said vehicle for passage therethrough of said first portion of said webbing; wherein said guide hole is in the form of a slot and comprises an intermediate slot portion extending substantially vertically along a side of said seat back, an upper slot portion which is continuous with the upper part of said intermediate slot portion and extends in the widthwise inner direction of said seat back, and a lower slot portion which is continuous with the lower part of said intermediate slot portion and extends in the widthwise outer direction of said seat back.

11. A webbing guide according to claim 10, wherein the junction between said upper slot portion and said intermediate slot portion is curved smoothly, and said upper slot portion extends substantially horizontally.

12. A webbing guide according to claim 11, wherein said lower slot portion extends substantially horizontally.

13. A webbing guide according to claim 12, wherein said guide hole is formed by a base plate mounted on said seat back and arm members projecting from said base plate.

14. A webbing guide according to claim 13, wherein said base member has a vertical wall portion disposed along a side of said seat back and a horizontal wall portion bent from the upper end of said vertical wall portion and extending along the top of said seat back.

15. A webbing guide according to claim 14, wherein said arm members consist of an upper arm projecting from said horizontal wall portion and extending along said horizontal and vertical wall portions, and a lower arm projecting from said vertical wall portion and extending generally in the shape of the letter J.

16. A webbing guide according to claim 15, wherein the free end of said upper arm and the free end of said lower arm are disposed in opposition with a clearance therebetween for insertion therethrough of said webbing laterally into said guide hole.

17. A webbing guide according to claim 10, wherein said base plate and said upper and lower arms are integrally formed of synthetic resin.

18. A webbing guide according to claim 10, wherein the junction between said upper slot portion and said intermediate slot portion is curved smoothly, and said upper slot portion extends obliquely upward.

19. A webbing guide according to claim 10, wherein said webbing guide is formed of a block member and is mounted on said seat back so as to form a substantially integral portion thereof.

* * * * *